R. DE KUYPER, Jr.
HOSE CONNECTION.
APPLICATION FILED APR. 28, 1913.

1,089,332.

Patented Mar. 3, 1914.

Witnesses
W. C. Fielding
S. P. Buck

Inventor
R. De Kuyper, Jr.
By Chandler & Chandler
Attorneys

UNITED STATES PATENT OFFICE.

RICHARD DE KUYPER, JR., OF HOOPER, UTAH.

HOSE CONNECTION.

1,089,332.  Specification of Letters Patent.  Patented Mar. 3, 1914.

Application filed April 28, 1913. Serial No. 764,184.

*To all whom it may concern:*

Be it known that I, RICHARD DE KUYPER, Jr., a citizen of the United States, residing at Hooper, in the county of Weber, State of Utah, have invented certain new and useful Improvements in Hose Connections; and I do hereby declare the following to be a full, clear, and exact description of the invention, such as will enable others skilled in the art to which it appertains to make and use the same.

This invention relates to hose couplings, and it more particularly relates to an improved form of hose coupling which is especially adapted for air brake connections.

An object of the invention is to provide a hose coupling of this character in which the oppositely disposed elements are interchangeable.

Another object is to provide a hose coupling of this character which is of simple construction, easy to operate, strong, comparatively inexpensive, and thoroughly efficient.

Other objects and advantages may be recited hereinafter and in the claims.

Figure 1:
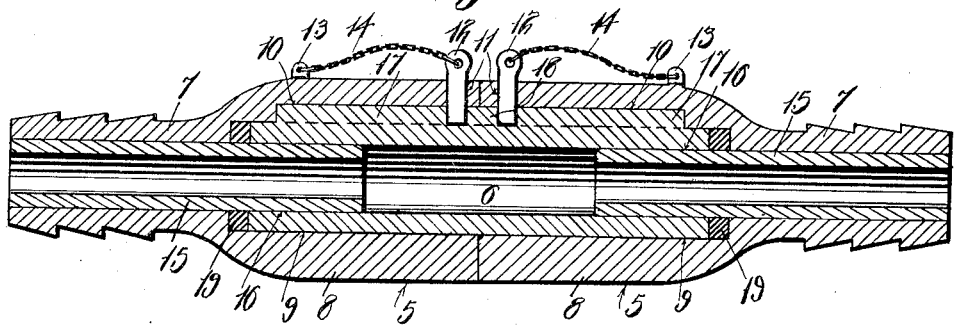
Figure 2:
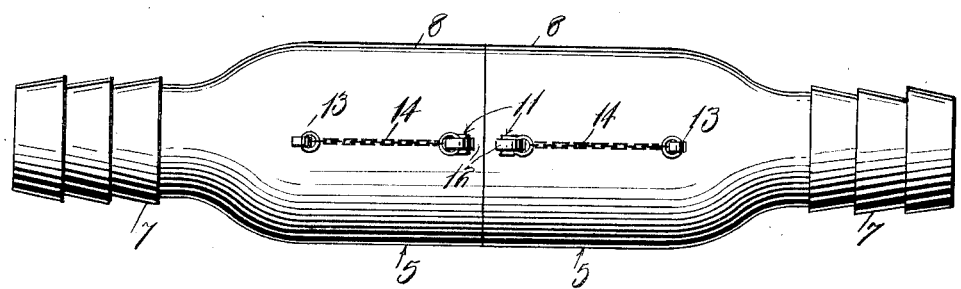
Figure 3:
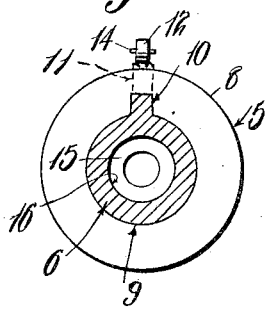
Figure 4:
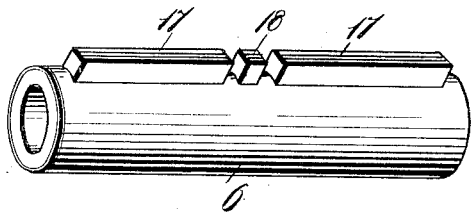

In the accompanying drawings, which supplement this specification: Figure 1 is a longitudinal vertical sectional view through my improved hose coupling complete. Fig. 2 is a top plan view of the complete hose coupling. Fig. 3 is an end elevation of one of the outer coupling members, the inner coupling member being in section, and Fig. 4 is a perspective view of the complete inner coupling member.

Referring to these drawings, in which similar reference characters correspond with similar parts, throughout the several views: The coupling consists of two counterpart outer members 5 and an inner cylindrical member 6 having counterpart and interchangeable end portions. Each outer coupling member consists of a shank 7 on which the hose is to be seated, and an enlarged end portion 8 provided with a cylindrical bore 9 and a rectangular recess or channel 10 communicating with each other. The periphery of each element 5 is provided with a radial bore or recess 11, communicating with the recess 10, for receiving a pin or fastener member 12. This fastener member is adapted to fit snugly in the recess 11 and to extend to the point at which the recess 10 merges with the central bore or recess 9. Each element 5 is also provided with an eye or apertured lug 13 to which a chain 14 may be attached for connecting the pin 12 thereto. Each outer section of the coupling is provided with a cylindrical tubular element 15 which extends into the central recess 9, being concentric therewith, so as to provide an annular space 16. The bushing or tubular member 15 extends through the shank 7 and is snugly fitted therein, and extends to the medial portion of the recess 9.

The member 6 is of substantially cylindrical-shape, and either end may be fitted snugly within either of the members 5, while the bushing 15 of either member 5 fits snugly within the contiguous end of the member 6. This member 6 is provided with a longitudinal rib 17 which is notched at 18, for the reception of the pins 12, this rib being fitted snugly within the opposing and alined recesses 10 of the outer coupling sections. One or more washers 19 of rubber, leather or other suitable material are fitted snugly within each annular recess 16, so as to effectually prevent any possible leakage between the end wall of said recess and the end wall of the member 6.

From the foregoing, it will be seen that the member 6 may be reversed with relation to either or both of the members 5, without altering or affecting the function or operation thereof, and it will also be seen that when this hose coupling is used in a train line, for air brakes, etc., the pin 12 may be removed from either member 5 so as to leave the members 6 in engagement with the other outer coupling member, when uncoupling the hose. However, when it is desired to couple one of the hose connections or sections with another similar section, in the event that one of the members 6 is already in engagement with each of the members 5, then, either of the similar members 6 may be removed and placed in safe keeping for future use, so that the remaining member 6 may be quickly engaged with both outer coupling members, for uniting them in the manner illustrated.

It will be seen that I have provided a hose coupling of this character which is fully capable of attaining the foregoing objects, in a thoroughly practical and efficient manner.

I do not limit my invention to the exact details of construction, combination and arrangement of parts, as herewith illustrated and described, but my invention may only be limited by a reasonable interpretation of the claims.

I claim:

1. A hose coupling consisting of two counterpart and interchangeable outer sections each of which is provided with a cylindrical bore and a rectangular channel merging therewith and a radial bore communicating with the channel, a tubular member extending into each of said cylindrical bores and providing an annular recess in each bore, and a reversible inner coupling member having counterpart end portions which fit within said outer sections and being provided with a notched rib which fits snugly in said channels while its ends are seated in said annular recesses, and fastening means fitted within the radial bores and extending into the notches of said rib.

2. A hose coupling consisting of a pair of counterpart and interchangeable outer sections each comprising a shank and an enlarged centrally bored end portion and having a radial bore communicating with the central bore, a cylindrical bushing fitted snugly in each of the shanks and extending into the central bore to a point between said radial bore and the inner end of said central bore, a cylindrical member having counterpart end portions fitted snugly around the bushings and fitted snugly within the central bores, and fastening means extending through the radial bores and engaged with said cylindrical member.

3. A hose coupling including mating outer members having registering longitudinal inner slots or grooves, an inner coupling member having a longitudinal rib snugly fitting in said grooves, said rib being provided with central notches, and pintles carried on flexible attaching means on said outer members and engageable in the notches formed in said rib.

In testimony whereof, I affix my signature, in the presence of two witnesses.

RICHARD DE KUYPER, Jr.

Witnesses:
DAMMER DE KUYPER,
C. R. HOLLINGSWORTH.

---

Copies of this patent may be obtained for five cents each, by addressing the " Commissioner of Patents. Washington, D. C."